US010180679B2

(12) United States Patent
Gerrits

(10) Patent No.: US 10,180,679 B2
(45) Date of Patent: Jan. 15, 2019

(54) SHEET PROCESSING DEVICE MEASURING AND PROCESSING EQUIPMENT FOR A PROPERTY OF MEDIA SHEETS FOR A PRINTER

(71) Applicant: Océ-Technologies B.V., Venlo (NL)

(72) Inventor: Antonius M. Gerrits, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 253 days.

(21) Appl. No.: 15/278,274

(22) Filed: Sep. 28, 2016

(65) Prior Publication Data
US 2017/0108850 A1 Apr. 20, 2017

(30) Foreign Application Priority Data
Oct. 14, 2015 (EP) .................................... 15189706

(51) Int. Cl.
G05B 19/4097 (2006.01)
B41J 3/44 (2006.01)
G06K 15/00 (2006.01)
B41J 11/00 (2006.01)
G06F 3/12 (2006.01)
H04N 1/23 (2006.01)
H04N 1/00 (2006.01)

(52) U.S. Cl.
CPC ............ G05B 19/4097 (2013.01); B41J 3/44 (2013.01); B41J 11/0095 (2013.01); G06F 3/1208 (2013.01); G06F 3/1229 (2013.01); G06F 3/1291 (2013.01); G06K 15/4065 (2013.01); H04N 1/0032 (2013.01); H04N 1/00567 (2013.01); H04N 1/2323 (2013.01); G03G 2215/00738 (2013.01); G05B 2219/45186 (2013.01); G06K 2215/101 (2013.01)

(58) Field of Classification Search
CPC .................................................... G05B 19/4097
USPC .................................................... 700/95–129
See application file for complete search history.

(56) References Cited

U.S. PATENT DOCUMENTS

| 7,648,293 B2* | 1/2010 | Lermant | B41J 11/485 358/1.15 |
| 7,924,458 B2* | 4/2011 | Taniuchi | B29C 67/0059 358/1.8 |
| 9,016,828 B2* | 4/2015 | Yatsunami | B41J 29/393 347/19 |
| 2010/0111548 A1* | 5/2010 | DeGruchy | G03G 15/6508 399/45 |

(Continued)

FOREIGN PATENT DOCUMENTS

JP 2000-6545 A 1/2000

OTHER PUBLICATIONS

Lee, Jung-Yong, et al. "Solution-processed metal nanowire mesh transparent electrodes." Nano letters;8.2 (2008): pp. 689-692. (Year: 2008).*

(Continued)

Primary Examiner — Satish Rampuria
(74) Attorney, Agent, or Firm — Birch, Stewart, Kolasch & Birch, LLP

(57) ABSTRACT

A sheet processing device that measures a property of media sheets to be processed in the device, controls a processing operation of the device on the basis of the measured property and transmits the measured property to another sheet processing device.

6 Claims, 2 Drawing Sheets

(56) References Cited

U.S. PATENT DOCUMENTS

2012/0287464 A1* 11/2012 Gerrits .............. H04N 1/00127
358/1.15

OTHER PUBLICATIONS

Alarousu, Erkki, et al. "Study on the use of optical coherence tomography in measurements of paper properties." Measurement Science and Technology;16.5 (2005): pp. 1131-1137. (Year: 2005).*
Finn, David J., Mustafa Lotya, and Jonathan N. Coleman. "Inkjet printing of silver nanowire networks." ACS applied materials & interfaces;7.17 (2015): pp. 9254-9261. (Year: 2015).*
Communication pursuant to Article 94(3) EPC, dated Apr. 26, 2018, for European Application No. 16192853.6.

* cited by examiner

SHEET PROCESSING DEVICE MEASURING AND PROCESSING EQUIPMENT FOR A PROPERTY OF MEDIA SHEETS FOR A PRINTER

CROSS-REFERENCE TO RELATED APPLICATIONS

This application claims priority under 35 U.S.C. § 119(a) to Application No. 15189706.3, filed in Europe on Oct. 14, 2015, the entire contents of which is hereby incorporated by reference into the present application.

BACKGROUND OF THE INVENTION

1. Field of the Invention

The present invention relates to a sheet processing device comprising measuring equipment for measuring a property of media sheets to be processed in the device, and a controller arranged to control a processing operation of the device on the basis of the measured property.

More particularly, the present invention relates to a printing device in which an image is formed on one or both sides of each media sheet.

An example of a property to be measured is the thickness of media sheets of a given type. This information may be needed for example for predicting the time when the maximum storage capacity of a sheet output stacker of the printing device will be reached and the stack of printed sheets will have to be removed. In order to predict how the height of the stack increases when sheets are processed and discharged onto the stack, it is necessary to know the thickness of the individual sheets.

In an ink jet printer, for example, the thickness information may also be needed for appropriately setting the height of the print head relative to the sheet transport path on which the sheets pass by underneath the print head.

As another example, when the printed sheets are intended for booklets, the measured sheet thickness may be used for calculating a so-called image creep that typically occurs when a booklet is formed.

Other examples of relevant media sheet properties that may be measured include the grain direction of paper sheets, the weight of the sheets, the stiffness of the sheets, humidity content of the sheets, and the like.

2. Description of the Background Art

If the type of the media sheets to be processed is known, it is frequently possible to retrieve the relevant sheet properties from a media catalogue in which the media type is listed. However, there may be cases where the media type is not known or the property information in the media catalogue is not exact or not reliable enough, for example, when the media properties depend upon varying environmental conditions such as temperature, air humidity and the like. For this reason, many printing devices have suitable measuring equipment for measuring the relevant properties of the media sheets that have been loaded into the device.

In a typical print shop, a plurality of printing devices are available, and these devices may have different features and different capabilities as far as the measurement of the media sheet properties is concerned. U.S. Application Publication No. 2012/287464 discloses a method of synchronizing media lists that are stored in different printing devices, so that the information on media sheet properties, as retrieved from a media catalogue, may be exchanged between the printing devices.

SUMMARY OF THE INVENTION

It is an object of the present invention to provide a sheet processing device, which permits a more efficient management of information of media sheet properties, in a system comprising a plurality of processing devices.

According to the present invention, in order to achieve this object, the processing device has a media property output interface connected to at least one data line for transmitting the measured property to another sheet processing device.

Consequently, information on media sheet properties that is not available in a media list but has been measured in the device according to the present invention can be made available also for other devices, so that these other devices need not have an expensive measuring equipment of their own. The media property output interface is linked to an input interface of at least one other device by a data line or network, so that the property information may be communicated electronically without intervention of an operator.

When the processing device according to the present invention is a printing device, the further processing device may be another printing device but might also be another kind of processing device, e.g. a finisher in which the information on the sheet properties may also be relevant or at least useful. Conversely, the device according to the present invention may be a finisher or other device in which the measuring equipment is installed, so that the measured properties may be communicated to other devices, e.g. to printing devices.

According to the present invention, a sheet processing system comprises a network for exchanging media sheet property information between at least one processing device and at least one further processing device.

In an embodiment of the sheet printing system, a media managing module is connected to the network and is arranged to retrieve measured data of media properties from a plurality of devices that are also connected to the network, and to distribute this data to other devices in the network. The data specifying the media properties may be accompanied by data that specifies the measuring tolerances of the device with which the measurement has been made. Then, based on the tolerance data, the measuring module may select, for each property, a processing device having measuring equipment that is capable of measuring the relevant data with the highest accuracy.

The scope of applicability of the invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

DETAILED DESCRIPTION OF THE PREFERRED EMBODIMENTS

Figure 1:
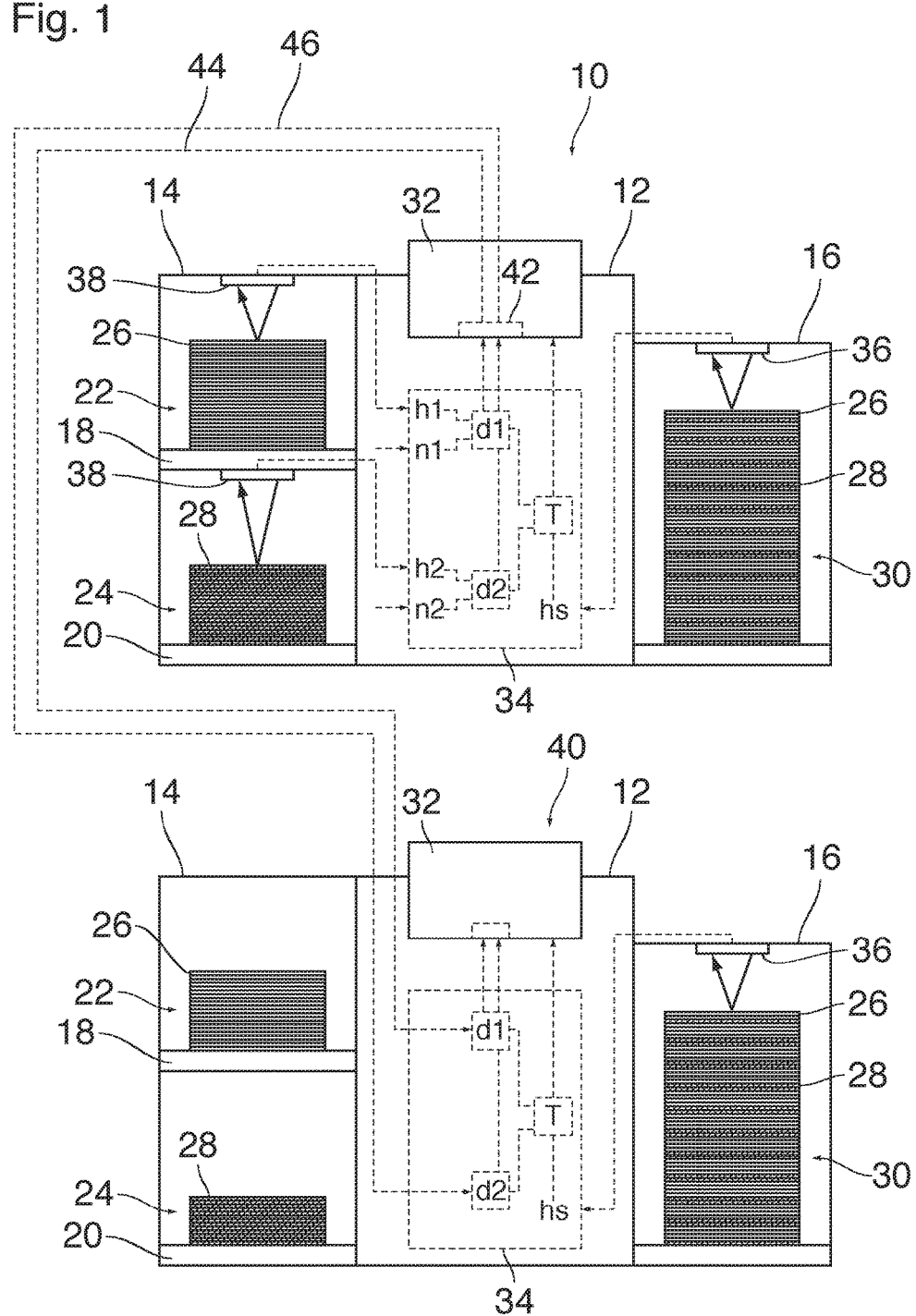
FIG. 1 is a diagram of a sheet processing system comprising two printing devices one of which is configured according to the present invention.

As an example of a sheet processing device according to the present invention, FIG. 1 shows a printing device 10 comprising a printer 12, a sheet input module 14 connected to a sheet input side of the printer, and an output stacker 16 connected to a sheet output side of the printer.

In the example shown, the sheet input module 14 has two input trays 18 and 20 with a stack 22, 24 of media sheets 26, 28 being loaded on each tray. The media sheets 26 on the tray 18 are of a different type and have different properties than the sheets 28 on the tray 20. As is commonly known in the art, the input module 14 is arranged to withdraw the media sheets, one by one, from the respective stack, and to feed them into the printer 12, on demand, and in accordance with the print job specifications. The printed sheets are then output to the output stacker 16, where the media sheets 26 of the first type and the media sheets 28 of the second type are stacked in a mixed sequence on a stack 30.

The printer 12 has a user interface 32 and a controller 34 which controls the operation of the entire printing device 10.

Conceivably, the output stacker 16 can only accommodate a stack 30 up to a certain maximum height. At a suitable time before this height is reached, an overflow signal should be output via the user interface 32 in order to alert the operator that the stack 30 should be removed in order for the print process to be continued without delay. It is therefore desirable to predict, on the basis of the sheets that have been scheduled for printing, an expected time T when the capacity of the output stacker 16 becomes exhausted. For that purpose, the output stacker 16 includes measuring equipment 36, e.g., an optical distance sensor, which is capable of measuring the current height hs of the stack 30 with high accuracy and to signal the measured height to the controller 34.

However, in order to obtain an accurate prediction of the time T, it is also necessary to know the thickness of the sheets 26, 28 that will be added to the stack 30 until the maximum height is reached. The information as to whether these sheets are media sheets 26 of the first type, or media sheets 28 of the second type, is available in the controller 34, which has scheduled the sheets for printing. However, when the thickness of the individual sheets cannot be read from a stored media list, it is necessary to measure also the thicknesses of the sheets 26 and 28. For this reason, also the input module 14 has measuring equipment 38 associated with each tray 18, 20, for accurately measuring the height of each stack 22, 24. Thus, the controller 34 receives a signal indicating the height h1 of the stack 22, and a signal indicating the height h2 of the stack 24. Further, the controller 34 counts the number n1 of the sheets 26 that are withdrawn from the stack 22 and the number n2 of sheets 28 that are withdrawn from the stack 24. Then, when a certain number of sheets 26 have been withdrawn, it is possible to calculate the thickness d1 of an individual sheet 26 by dividing the change in the height h1 that has occurred during a certain time interval by the number of sheets that have been withdrawn in that time interval. Similarly, the thickness d2 of an individual sheet 28 can be calculated from the measured height h2 and the counted number n2.

Whenever a sheet 26 for the first time is placed on top of the stack 30 in the output stacker, the height hs will be increased by d1, and when a sheet 28 of the second type is stacked, the height hs will be increased by d2. Thus, on the basis of the sheets that are scheduled for printing, it is possible for the controller 34 to calculate the time T at which the height hs will have reached the maximum value, so that an overflow signal can be output at an appropriate timing, and if the operator does not react in time, the printer 12 can be shut down before any damage is caused.

As is shown in FIG. 1, the processing system comprises a second printing device 40, which has basically the same design as the first printing device 10 described above, but with the difference that the sheet input module 14 does not have the measuring equipment 38.

More generally, it may be assumed that the sheet input module of the second printing device 40 does have some equipment for coarsely measuring the height of the stacks 22 and 24, but not with the high accuracy that is achieved by the equipment 38. It will also be possible that the input module 14 and the controller 34 of the second printing device are not capable of counting and storing the numbers of sheets that are withdrawn from the stacks 22, 24. Consequently, it is not possible to measure the thicknesses d1 and d2 of the sheets in the second printing device.

In order to nevertheless predict the time T in the second printing device 40 on the basis of the height of the stack 30 measured with the measuring equipment 36, it would be possible to store estimated values for the sheet thicknesses in the controller 34.

In the proposed printing system, however, in order to make the prediction of the time T in the second printing device easier and more reliable, the first printing device 10 has a media property output interface 42 connected to the controller 34 of the second printing device 40 via data lines 44 and 46. Consequently, when the sheets stacked on the trays 18, 20 of the second printing device 40 are of the same type as the sheets on the respective trays in the first printing device 10, the information on the thicknesses d1 and d2 that is available in the first printing device 10 can also be used in the second printing device 40 for predicting the time T (or for any other purpose).

Similarly, if the first printing device 10 has any other measuring equipment for measuring other properties of the media sheets 26 and 28, such as the stiffness of the sheets (which information may be needed for appropriately controlling blowers with which the sheets are deflected on their way through the printer 12), or the humidity content of the sheets (needed for calculating the durations and/or temperatures of fuse processes in the printer 12). In such a case, the sheet property output interface 42 will be arranged to communicate also this information to the second printing device 40.

Of course, the concept described above may be extended to processing systems comprising more than two printing devices or other sheet processing devices.

Figure 2:
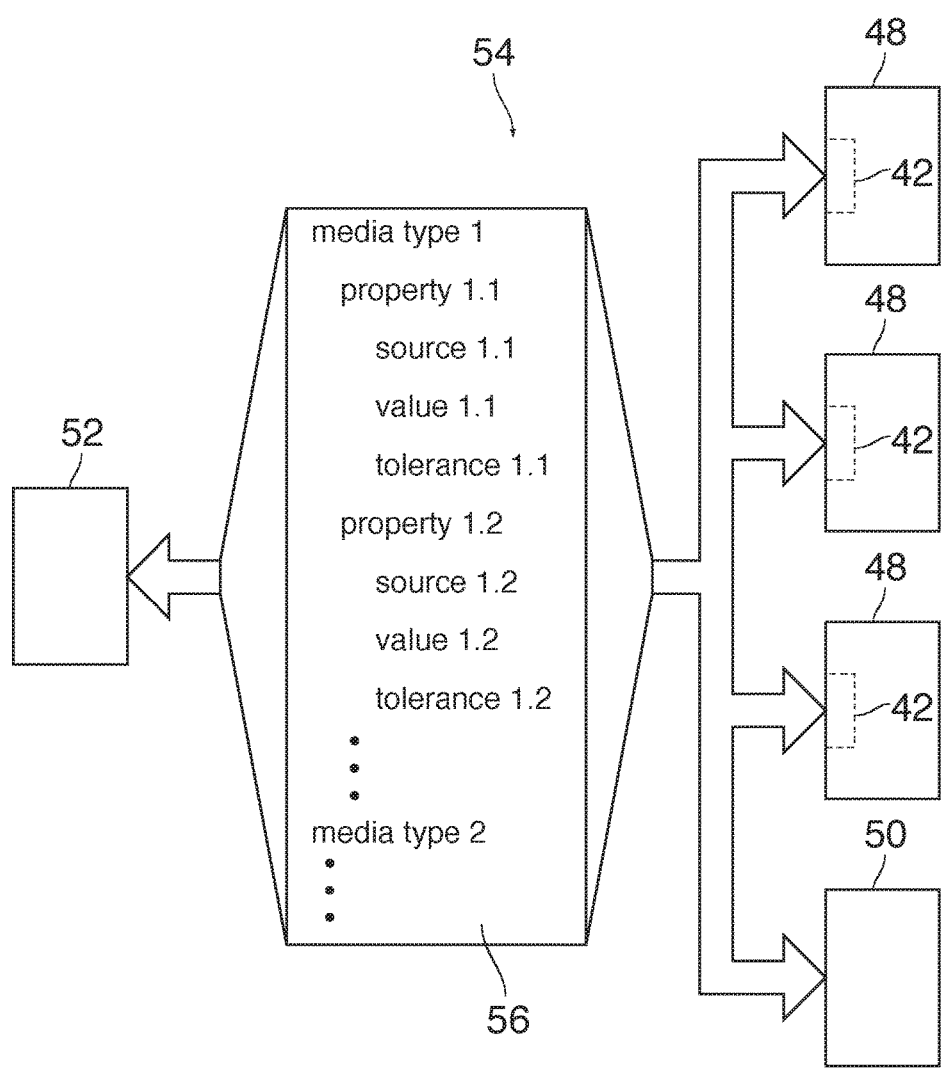
FIG. 2 is a diagram of a sheet processing system with a plurality of processing devices linked by a network.

As an illustrative example, FIG. 2 shows a sheet processing system with four sheet processing devices 48, 50 and a media managing module 52 interconnected by a data network 54. By way of example, three of the four processing devices 48 have measuring equipment and a media property output interface 42 connected to the network 54.

The network 54 is configured to permit bi-directional communication between the media managing module 52 and each of the processing devices 48, 50. Optionally, the network 54 may also permit direct communication among the different sheet processing devices 48, 50.

The data structure of the data that is transmitted via the network 54 has been expanded in a table 56. The processing devices 48, 50 are capable of processing media sheets which belong to different media types, designated here as "media type 1", "media type 2", etc. More precisely, for each of the media types, there is at least one of the processing devices 48, 50 that is capable of processing the sheets of this type.

The media sheets of each type may have a number of properties, such as thickness, stiffness, etc. The properties shown for "media type 1" are designated as "property 1.1", property 1.2", etc. Three different data items "source," "value," and "tolerance" are associated with each property. The item "source" identifies one of the processing devices 48 (having a media property output interface 42), which is designated by the media managing module 52 to provide the measurement results for the pertinent property. The item "value" specifies the value of that property as measured in the processing device 48 that has been designated as "source". The item "tolerance" specifies the accuracy with which the property can be measured by the source.

In a preparatory step, the media managing module 52 queries all connected processing devices 48, 50 for each media type, and each property thereof, and determines whether each processing device 48, 50 is capable of measuring that property. If it is determined that a processing devices 48, 50 is capable of measuring that property, then the accuracy of the measurements are determined by the processing devices themselves, wherein each processing device may include measuring equipment to produce such measurements. In response, the processing devices 48 transmit the item "tolerance" that specifies these accuracies to the managing module 52. Then, the module 52 selects the processing device that can measure the property with the highest accuracy and designates this device as "source."

Subsequently, whenever the "source" is operating and is processing sheets of the media type have been designated as the source, the processing device transmits the measured results for the property for which it has been designated as source to the managing module 52, and the managing module relays these data to all the other processing devices where the information is needed. Optionally, the processing devices may receive the data items "value" directly from the source.

In this way, it is assured that all processing devices will always utilize the most accurate and most reliable property information that is available.

It will be understood that the accuracy with which a certain property can be measured in a given processing device 48 may depend upon the media type. For example, when the property to be measured is the sheet thickness, one of the processing devices 48 may be selected for measuring the thickness of sheets of the media type 1, whereas the thickness of sheets of the media type 2 is measured more accurately in another of the processing devices 48.

In an alternative embodiment, the value for a source parameter is assigned by an operator. If in a certain configuration of processing systems, it is known which of the devices performs best for a measurement of a property of a media, such a device can be assigned by the operator via the user interface as source for that property of a certain media type. Data network 54 may be implemented as a wireless network; likewise data lines 44 and 46 may be implemented as wireless connections.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A printer, comprising:
   measuring equipment for measuring a property of media sheets to be processed in the printer;
   a controller arranged to control a processing operation of the printer on the basis of the measured property;
   a media property output interface connected to at least one data line for transmitting the measured property to another printer; and
   at least one input tray and an output stacker,
   wherein the measured property is a height of at least one stack of media on the at least one input tray, and
   wherein the processing operation of the controller includes determining a time a height of a stack of media on the output stacker reaches a maximum value and outputting an overflow signal to a user interface of the printer to alert an operator that the stack of media on the output stacker to be removed.

2. The printer according to claim 1, wherein the measuring equipment is arranged to measure a thickness of the media sheets.

3. A printer fleet comprising a plurality of printers,
   wherein each of the plurality of printers includes a media property output interface configured to communicate with other printers of the plurality of printers,
   wherein at least one of the plurality of printers further includes:
      measuring equipment for measuring a property of media sheets to be processed in the at least one printer; and
      a controller arranged to control a processing operation of the at least one printer on the basis of the measured property,
   wherein the media property output interface of the at least one printer is configured to transmit the measured property to another printer of said plurality of printers, and
   wherein the media property output interface of each of the printers are connected to one another by a data network,
   wherein the at least one printer comprises at least one input tray and an output stacker,
   wherein the measured property is a height of at least one stack of media on the at least one input tray, and
   wherein the processing operation of the controller includes determining a time a height of a stack of media on the output stacker reaches a maximum value and outputting an overflow signal to a user interface of the at least one printer to alert an operator that the stack of media on the output stacker to be removed.

4. The printer fleet according to claim 3, wherein the at least one printer includes two printers, and
   wherein media managing modules of the plurality of printers are arranged to manage the exchange of measured property data among the printers.

5. The printer fleet according to claim 4, wherein the media property output interfaces of at least two of the printers are capable of transmitting tolerance data specifying an accuracy with which the measured property data is measurable in the respective printer, and
   wherein the media managing module is arranged to select from among the media property output interfaces, the one media property output interface from which the tolerance signal indicates the highest accuracy, and to designate said one media property output interface as a source from which the measured property is communicated to the other printers.

6. The printer fleet according to claim 4, wherein the media managing module is arranged to select from the media output interfaces, the one media output interface that is designated by an operator as a source from which the measured property data is communicated to the other printers.

* * * * *